United States Patent [19]

Shortle et al.

[11] Patent Number: 4,613,201

[45] Date of Patent: Sep. 23, 1986

[54] LIGHT PROJECTION APPARATUS

[75] Inventors: Martin C. Shortle, Huntingdon; Daniel R. Lobb, Chislehurst, both of England

[73] Assignee: Dwight Cavendish Co., Ltd., Cambridgeshire, England

[21] Appl. No.: 747,431

[22] Filed: Jun. 21, 1985

Related U.S. Application Data

[63] Continuation of Ser. No. 457,960, Jan. 14, 1983, abandoned.

[30] Foreign Application Priority Data

Jan. 19, 1982 [GB] United Kingdom ................. 8201486

[51] Int. Cl.⁴ ....................... G02B 26/10; G02B 27/18
[52] U.S. Cl. ..................................................... 350/6.1
[58] Field of Search .......................................... 350/6.1

[56] References Cited

U.S. PATENT DOCUMENTS 3,818,129  6/1974  Yamamoto ...................... 178/7.3 D

OTHER PUBLICATIONS

Baker, "Laser Display Technology", ISEE Spectrum, 12/68, pp. 39–50.
Funkschau, 1970, Heft 4, Title Fabfermseh-Grossprojektion mit Laser.

Primary Examiner—John K. Corbin
Assistant Examiner—Rebecca D. Gass
Attorney, Agent, or Firm—Murray and Whisenhunt

[57] ABSTRACT

Light projection apparatus including a laser device and a light separation device for producing red, green and blue light beam components. Ultrasonic diffraction acousto-optical devices are provided for modulating the red, green and blue light beam components respectively, and a scanning device is provided for receiving modulated light from the acousto-optical devices and projecting the light onto a viewing surface. The red, green and blue light beam components are arranged relative to their respective acousto-optical devices so that they intercept the acoustic wave corresponding to any given signal moving through the respective crystals at different times to achieve time differences in modulation of the three components for the given signal. The scanning device is arranged to scan in two dimensions to form a raster.

14 Claims, 1 Drawing Figure

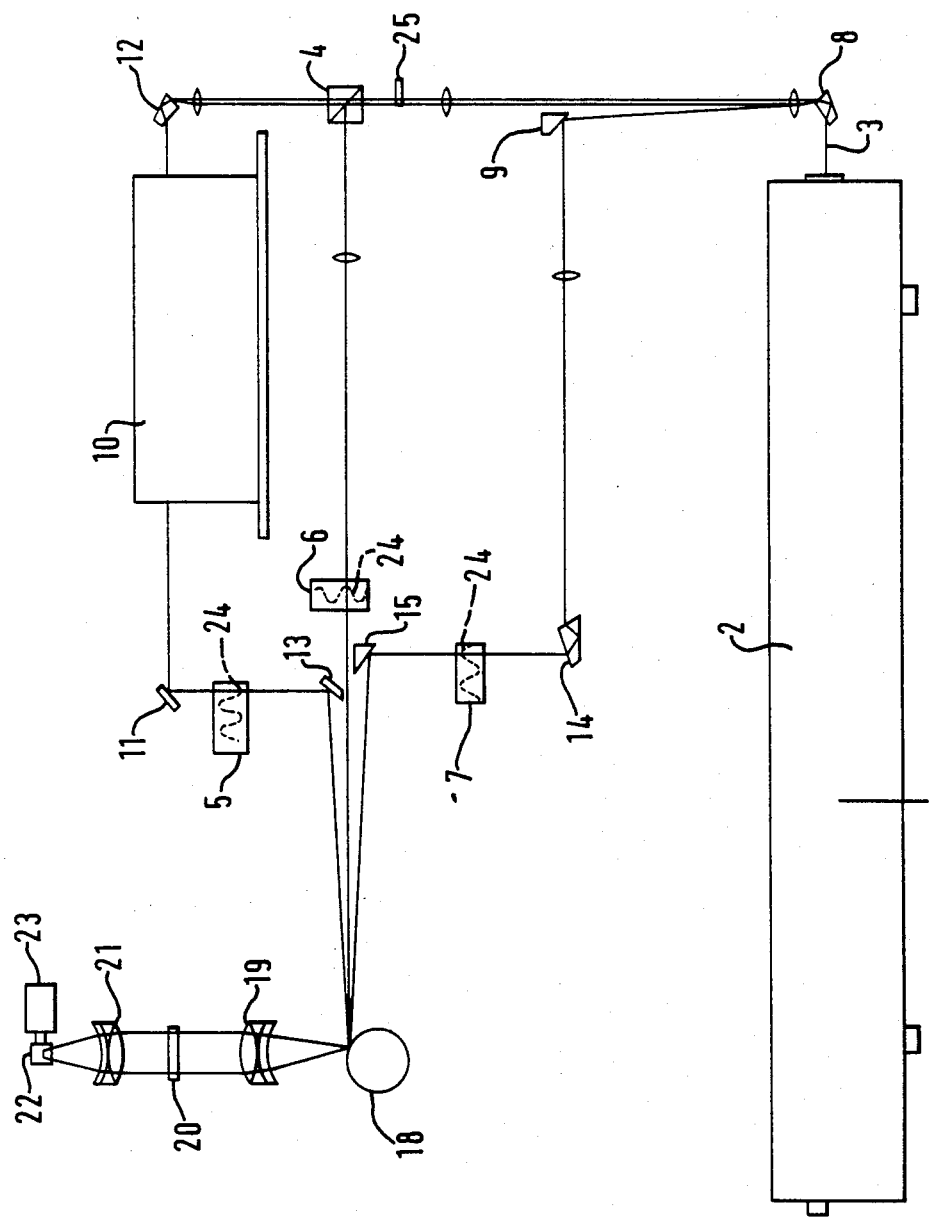

LIGHT PROJECTION APPARATUS

This application is a continuation of Ser. No. 457,960, filed Jan. 14, 1983, now abandoned.

DESCRIPTION

The invention relates to a light projection apparatus, more particularly but not exclusively for use in the projection of television or video pictures and similarly derived images of computer generated or other visual information on to large screens.

Several attempts have been made to produce commercially acceptable large screen colour television apparatus but as yet none of them has been entirely successful especially at screen sizes above a few meters, usually for reasons of cost, picture brightness and picture definition.

When lasers first become available it was soon appreciated that they might be used to provide cathode-ray tube type of display, that is to say a raster scanning display, of large screen size and a great deal of effort has been expended on achieving this object. For various reasons the goal has proved difficult to realise in practice although at least in theory the various components of the necessary system have been available for some time. This is evident from a paper by Charles E. Baker of Texas Instruments Inc. presented at the 1968 IEEE International Convention in New York, N.Y., in March, 1968. One particular problem is the generally low efficiency of lasers combined with the low efficiency of the optics of the necessary projection system, which results in unacceptable low picture brightness at large screen sizes. An increase in laser output involves an unacceptable increase in cost. Another problem involves the production of suitable red, blue and green light components from a single laser, since the eye has unequal sensitivity to the three primary colours. One approach which has been suggested is the use of three separate lasers to produce the primary colours but here again the question of cost becomes significant. It is an object of the invention to provide relatively inexpensive but nevertheless workable projection apparatus.

According to the invention there is provided, in light projection apparatus in which laser means and light separation means are provided for producing red, green and blue light beam components, in which ultrasonic diffraction acousto-optical devices are provided for modulating the red, green and blue light beam components respectively and in which scanning means are provided to receive modulated light from the acousto-optical devices and to project the light on to a viewing surface, the improvement which comprises arranging the red, green and blue light beam components relative to their respective acousto-optical devices so that they intercept the acoustic wave corresponding to any given signal moving through the respective crystals at different times to achieve time differences in modulation of the three components for said given signal and providing said scanning means to scan in two dimensions to form a raster.

Since the three component light beams are static relative to one another when they are fed to the raster scanning means, the problems of alignment and dynamic convergence associated with conventional cathode-ray tube devices are avoided.

The raster scanning means may comprise first mirror means comprising a rotatable multi-faceted mirror, means for rotating the multi-faceted mirror, second mirror means disposed to receive the light beam reflected from the multi-faceted mirror and comprising a mirror arranged to pivot about an axis normal to the axis of rotation of the multi-faceted mirror, means for rotating the mirror of the second mirror means about its pivotal axis and means for synchronising movement of the first and second means. The cross-section of the multi-faceted mirror is preferably a regular polygon, having for example, twenty five faces, the mirror being arranged for high speed rotation about its axis of symmetry. The mirror of the second mirror means may itself be a rotatable multi-faceted mirror but is preferably a plane mirror arranged to be swung or rocked to and fro through a small angle, that is to say a galvanometer scanner. The rocking mirror preferably has its pivotal axis disposed in a plane containing the axis of the light beams reflected from the multi-faceted mirror. The rocking mirror is preferably driven from synchronisation pulses derived from the drive signal to the rotating multi-faceted mirror.

The need for precise timing in both rocking directions will be understood, although only during rocking in one direction will the plane mirror be "live". In the other direction the mirror is required to flip-back to a precise point during the "fly-back" period associated with the television or other image production system.

The raster scanning means may comprise a lens or lens system disposed between the first and second mirror means, e.g. between the multi-faceted mirror and the rocking mirror.

As is known, in an ultrasonic diffraction acousto-optical device a crystal is bombarded with ultrasonic acoustic energy to produce a wave in the crystal which affects transmission of light through the crystal in the manner of a diffraction grating. Since the arrangement is such that the green, blue and red light components are arranged relative to their respective acousto-optical devices so that they each intercept the acoustic wave moving through the respective modulating crystals at different positions in the crystal to achieve in effect a variation in the position of the modulating signal of the three colours, this might be considered as an optical signal delay line.

To permit the apparatus to project images derived from signals such as television encoded signals, electronic means is provided for controlling each modulating means and for synchronising the rotation of the multi-faceted mirror and the motion of the rocking mirror of the raster scanning means.

Safety means is preferably provided to interrupt the beams from the or each laser in the event that the raster scanning means fails. The safety means comprise light sensitive devices disposed at the marginal portions of the beam path from the scanner and/or the marginal portions of the target and arranged such that any failure to address each device during scanning will cause the laser beams to be interrupted.

The invention is diagrammatically illustrated by way of example in the accompanying block diagram of light projection apparatus according to the invention.

In the drawing light projection apparatus for producing colour television pictures on a large screen (not shown) comprises an argon-ion laser 2 driven all lines to produce a beam of light 3 which is dispersed by a prism 8. A wedge-shaped mirror 9 is disposed in the dispersed light beams to deflect a portion of these to a blue modulator 7 via a dispersing prism 14 while the remaining portion of the dispersed light beams strike a polarising prism 4 via a stress plate 25 which can introduce a changed polarisation component to the beam incident upon the polarising prism 4. Such re-polarised light is reflected by the polarising prism 4 to a green modulator 6 whilst the remaining portion of the light striking the device passes through the device and is fed via a prism 12 to a red dye laser 10 so as to energise or pump the dye laser. The output from the red laser 10 is fed via a mirror 11 to a red modulator 5. The outputs from the red, green and blue modulators are then converged with the aid of mirrors 13 and 15 and fed to a raster scanning device from which the beam is projected onto a screen (not shown).

The raster scanning device comprises a multi-faceted mirror 18 shaped in plan as a regular polygon, e.g. with 25 faces and arranged for rotation at high speed about its axis of symmetry. Due to rotation of the mirror 18 the beam is reflected from the mirror faces through an angle which varies cyclically through an arc. The reflected beam is passed through a lens system referenced 19, 20, 21 and is directed onto a plane mirror 22 which is pivoted for rocking movement about an axis normal to the axis of rotation of the multi-faceted mirror 18 and normal to the optical axis of the lens system 19, 20, 21. The plane mirror 22 is under the control of a galvanometer scanner 23. The light beam reflected from the surface of the mirror 22 is thus deflected through an angle which varies cyclically through an arc during rocking of the mirror. The drive means to the mirror 22 is such that rocking of the mirror in one direction is substantially faster than rocking of the mirror in the opposite direction to reduce "fly-back" time during scanning. The light beams from the mirror 22 then passes to a viewing screen (not shown).

In the drawing the wave patterns in the respective crystal of the acousto-optical modulators are indicated by dotted lines 24 and it will be seen that the blue, red and green light beams pass through their respective acousto-optical modulators 7, 5 and 6 respectively at different positions in the crystal in the respective wave patterns. This is done in order to compensate for the fact that the three component light beams strike the rotating mirror at different angles and are thus displaced on the plane mirror 22 and on the target screen. Compensation is achieved by reason of the fact that by arranging the beams to strike the waves of their respective modulators at different positions a delay in the time at which any of the three colour components of a given signal is modulated is produced.

It will be noted from the drawing that lenses 26,27,28,29,30 and 31 are positioned in the system between components 8 and 12, 9 and 14, 4 and 6, and 11 and 12. These lenses are present to correct for the natural divergence of the laser beams.

We claim:

1. Light projection apparatus, comprising:
   a primary laser light source;
   beam splitting means for splitting a light beam from said primary laser light source into first, second and third components, said first component being a blue light beam component, and said second component being a green light beam component;
   a dye laser arranged to receive said third component, said dye laser being energized by said third component to produce a red light beam component;
   modulating means for modulating said green, blue and red light beam components;
   raster scanning means for receiving modulated light from said green, blue and red modulating means and for projecting the light on to a viewing surface.

2. Light projection apparatus according to claim 1, wherein said beam splitting means comprises a dispersing prism and a polarising means, said dispersing prism splitting said laster light beam into said blue light beam component and a further component, said polarising means splitting said further component into said second and third components.

3. Light projection apparatus according to claim 1, wherein said primary laser light source is an argon ion laser.

4. Light projection apparatus according to claim 1, wherein said modulating means comprise ultrasonic diffraction acousto-optical devices, and wherein said green, blue and red light beam components are arranged relative to their respective modulating devices so that they intercept an acoustic wave moving through the respective crystals at different times to achieve a time difference in modulation of said green, blue and red light beam components for any given signals.

5. In light projection apparatus in which primary and dye laser means and light separation means are provided for producing red, green and blue light beam components, the red component being produced by the dye laser means, in which ultrasonic diffraction acousto-optical devices are provided for modulating the red, green and blue light beam components respectively and in which scanning means are provided to receive modulated light from the acousto-optical devices and to project the light on to a viewing surface, the improvement which comprises arranging the red, green and blue light beam components relative to their respective acousto-optical devices so that they intercept the acoustic wave corresponding to any given signal moving through the respective crystals at different times to achieve time differences in modulation of the three components for said given signal and providing said scanning means to scan in two dimensions to form a raster.

6. In a light projection method in which red, green and blue light beams are modulated by respective ultrasonic diffraction acousto-optical devices and received by scanning means which project the light on to a viewing surface, the improvement which comprises the steps of:
   disposing the red, green and blue light beams relative to their respective acousto-optical devices so that they intercept the acoustic wave corresponding to any given signal moving through the respective crystals at different times to achieve time differences in modulation of the three beams for said given signal, and which scans in two dimensions to form a raster projecting the modulated beams on to said viewing surface by two-dimensional raster scanning means.

7. A light projection method according to claim 6, wherein the scanning means effects a primary scan in a direction corresponding to the direction of the acoustic wave and a secondary scan in the orthogonal dimension.

8. A light projection method according to claim 6, wherein said light beams are incident at different angles on said scanning means and said time differences in modulation of the three beams compensate for said different angles of incidence.

9. In light projection apparatus in which laser means and light separation means are provided for producing red, green and blue light beam components, in which ultrasonic diffraction acousto-optical devices are provided for modulating the red, green and blue light beam components respectively and in which scanning means are provided to receive modulated light from the acousto-optical devices and to project the light on to a viewing surface, the improvement which comprises arranging the red, green and blue light beam components relative to their respective acousto-optical devices so that they intercept the acoustic wave corresponding to any given signal moving through the respective crystals at different times to achieve time differences in modulation of the three components for said given signal and providing said scanning means to scan in two dimensions to form a raster.

10. Light projection apparatus according to claim 9, wherein said raster scanning means comprises primary scanning means disposed to scan a direction corresponding to the direction of the acoustic wave and secondary scanning means disposed to scan in an orthogonal direction.

11. Light projection apparatus according to claim 9, wherein the primary laser means comprises an argon ion laser.

12. Light projection apparatus according to claim 9, wherein said light beam components are incident at different angles on said raster scanning means, said time differences in modulation of the three components compensating for said different angles of incidence.

13. Light projection apparatus according to claim 9, which includes safety means to interrupt the light beams in the event of failure of the raster scanning means, the safety means comprising detection devices arranged such that any failure to address each device during scanning will cause the light beams to be interrupted.

14. Light projection apparatus according to claim 9, wherein said laser means comprises primary laser means and dye laser means, said red light beam component being produced by said dye laser means.

* * * * *

UNITED STATES PATENT AND TRADEMARK OFFICE
CERTIFICATE OF CORRECTION

PATENT NO. : 4,613,201

DATED : September 23, 1986

INVENTOR(S) : Shortle et al

It is certified that error appears in the above-identified patent and that said Letters Patent is hereby corrected as shown below:

On the face of the patent please change name of
Assignee to: Dwight Cavendish Holdings Limited, Cambridgeshire, England Signed and Sealed this Tenth Day of February, 1987

*Attest:*

DONALD J. QUIGG

*Attesting Officer*  *Commissioner of Patents and Trademarks*